United States Patent
Okita et al.

(10) Patent No.: US 7,187,148 B2
(45) Date of Patent: Mar. 6, 2007

(54) CONTROLLER

(75) Inventors: Tadashi Okita, Fujiyoshida (JP); Yukio Toyozawa, Kumamoto (JP); Hiroyuki Kawamura, Yamanashi (JP); Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 3 days.

(21) Appl. No.: 11/287,336

(22) Filed: Nov. 28, 2005

(65) Prior Publication Data

US 2006/0113946 A1 Jun. 1, 2006

(30) Foreign Application Priority Data

Nov. 26, 2004 (JP) ............................. 2004/341770

(51) Int. Cl.
*H02P 7/00* (2006.01)
(52) U.S. Cl. ........................... 318/432; 318/651; 318/6; 318/7; 318/434; 318/560; 318/561
(58) Field of Classification Search ................ 318/432, 318/651, 6, 7, 434, 560, 561, 600, 601, 632, 318/615, 618, 610, 611
See application file for complete search history.

(56) References Cited

U.S. PATENT DOCUMENTS

2002/0135928 A1* 9/2002 Aikawa et al. .......... 360/77.02

2005/0094309 A1* 5/2005 Lee ......................... 360/78.06
2005/0162111 A1* 7/2005 Tsutsui ..................... 318/434

FOREIGN PATENT DOCUMENTS

JP 6-91482 4/1994

* cited by examiner

*Primary Examiner*—Karen Masih
(74) *Attorney, Agent, or Firm*—Staas & Halsey LLP

(57) ABSTRACT

Disclosed is a controller for restraining vibration of a driven element driven by a servomotor. The driven element driven by the servomotor is provided with acceleration detecting means. A correction value is obtained by multiplying a detected acceleration value detected by the acceleration detecting means by a coefficient. Correction is made by subtracting the correction value from a velocity command, and velocity feedback control is executed in a velocity control processing section to obtain a current command. Further, the servomotor is driven by current control processing, whereupon the driven element is moved. If the detected acceleration value is increased by vibration of the driven element, the velocity command is corrected to restrain the vibration, so that the vibration of the driven element can be restrained. Processing time can be shortened to restrain the vibration of the driven element by executing the correction of the velocity command based on the detected acceleration value for each velocity control period.

21 Claims, 10 Drawing Sheets

CONTROLLER

BACKGROUND OF THE INVENTION

1. Field of the Invention

The present invention relates to a controller for drivingly controlling a servomotor in a machine tool, and more particularly, to a controller configured so that acceleration detecting means is provided on the machine tool to feed back acceleration information, to thereby stabilize an operation of the machine tool.

2. Description of Related Art

Normally, position, velocity, and current feedback controls are performed in a machine tool to control the position and velocity of a driven element that is driven by a servomotor. FIG. 16 is a block diagram showing a servo control section for controlling the servomotor. A servomotor 2 or a driven element 3 that is driven by the servomotor 2 is provided with velocity detecting means 5 and position detecting means 6 for detecting its velocity and position, respectively. Further, it is provided with current detecting means 4 for detecting the value of a current for driving the servomotor 2. Detected signals from the detecting means 4 and 5 are fed back.

In a position control processing section 11, a position deviation is obtained from a position command and a position feedback signal from the position detecting means 6, and a velocity command is obtained by multiplying the position deviation by a position loop gain. In a velocity control processing section 12, moreover, a velocity deviation is obtained from a velocity command outputted from the position control processing section 11 and a velocity feedback signal from the velocity detecting means 5, and a current command is obtained by velocity feedback control such as proportional plus integral (or integral plus proportional) control. In a current control processing section 13, current feedback control is performed using the current command and a current feedback signal, and the servomotor 2 is drivingly controlled with the aid of a servo amplifier.

In the above-described conventional control method of controlling the position, velocity, and current of the driven element 3, e.g., a feed axis of a machine tool, the position, velocity, and current are normally controlled by processors. If the angular acceleration of the servomotor 2 changes suddenly, the driven element 3 sometimes may vibrate despite the position, velocity, and current feedback controls. To cope with this, a control method is proposed in which a signal from an acceleration sensor for detecting the acceleration of the driven element 3 is subtracted from a current command outputted by the velocity feedback control, and the resulting difference is used as a current command for the current feedback control.

If vibration is generated in the driven element, a vibration component in an acceleration signal from the driven element detected by the acceleration sensor causes an error against the current command for the current feedback control. Therefore, the vibration is restrained by controlling the driving current of the servomotor with the vibration component subtracted from the current command to eliminate the error (see Jpn. Pat. Appln. KOKAI Publication No. 6-91482).

It is known that response can be improved by differential control in a control system. Also in position/velocity control of the servomotor, the response can be enhanced by using PID (proportional plus integral plus derivative) control for velocity loop control. However, acceleration information that is obtained by differentiating position or velocity information from a position or velocity sensor (or by differentiating the velocity deviation) has problems of much noise and poor controllability. If a filter is additionally used to remove noise, moreover, phase change that is caused by the filter inevitably worsens the controllability.

Acceleration information with less noise and phase change can be obtained with used of an acceleration sensor such as the one described in JP 6-91482A. According to the invention described in this patent document, however, the current command is corrected for current control processing based on a detected acceleration value detected by the acceleration sensor.

In general, a current control period is shorter than a velocity control period, so that processing time increases if the current command is corrected with the detected acceleration value.

In a method where a detected acceleration value is subtracted from a current command value, moreover, a satisfactory vibration restraint effect sometimes cannot be obtained, owing to a delay in communication for capturing the detected acceleration value into a controller or a delay from the current command input to the start of movement of the driven element. Furthermore, there is a problem that the integral of the acceleration information fails to become zero when the driven element returns to its original position after reciprocation under correction control of the current command with the detected acceleration value detected by the acceleration sensor.

SUMMARY OF THE INVENTION

A controller of the present invention controls a servomotor for driving a driven element in accordance with a velocity command designating a velocity of the driven element. According to an aspect of the present invention, the controller comprises: velocity detecting means for detecting the velocity of the driven element; a velocity control processing section for controlling the velocity of the driven element based on the velocity command and the detected velocity by the velocity detecting means; acceleration detecting means for detecting an acceleration of the driven element; and correcting means for correcting the velocity command based on the detected acceleration by the acceleration detecting means.

The correcting means may correct the velocity command by subtracting a product by multiplying the detected acceleration by a predetermined coefficient, from the velocity command.

The controller may further comprise a current control processing section for controlling a current for driving the servomotor in accordance with a current command outputted from the velocity control processing section, and a velocity estimation processing section for estimating the velocity of the driven element based on the detected acceleration by the acceleration detecting means, and means for correcting the current command based on the estimated velocity.

According to another aspect of the invention, the controller comprises: velocity detecting means for detecting the velocity of the driven element; a velocity control processing section for controlling the velocity of the driven element based on the velocity command and the detected velocity by the velocity detecting means; acceleration detecting means for detecting an acceleration of the driven element; and correcting means for correcting the velocity command value based on the detected acceleration by the acceleration detecting means and a first-order differential of the velocity command.

The controller may further comprises a position control processing section for controlling a position of the driven element based on a position command designating a position of the driven element and a detected position of the driven element and outputting the velocity command to the velocity control processing section, and the correcting means may correct the position command in place of the velocity command.

According to still another aspect of the invention, the controller comprises: velocity detecting means for detecting the velocity of the driven element; acceleration detecting means for detecting an acceleration of the driven element; a velocity estimation processing section for estimating the velocity of the driven element based on the detected acceleration by the acceleration detecting means; and a velocity control processing section for controlling the velocity of the driven element based on the velocity command, the estimated velocity by the velocity estimation processing section and the detected velocity by the velocity detecting means.

According to still another aspect of the invention, the controller comprises: acceleration detecting means for detecting an acceleration of the driven element; a velocity estimation processing section for estimating the velocity of the driven element based on the detected acceleration by the acceleration detecting means; and a velocity control processing section for controlling the velocity of the driven element based on the velocity command and the estimated velocity by the velocity estimation processing section.

According to still another aspect of the invention, the controller comprises: velocity detecting means for detecting the velocity of the driven element; a velocity control processing section for controlling the velocity of the driven element based on the velocity command and the detected velocity by the velocity detecting means and outputting a current command; a current control processing section for controlling a current for driving the servomotor in accordance with the current command outputted from the velocity control processing section; acceleration detecting means for detecting an acceleration of the driven element; and correcting means for correcting the current command based on the detected acceleration by the acceleration detecting means and a first-order differential of the velocity command.

According to still another aspect of the invention, the controller comprises: velocity detecting means for detecting the velocity of the driven element; a velocity control processing section for controlling the velocity of the driven element based on the velocity command and the detected velocity by the velocity detecting means and outputting a current command; a current control processing section for controlling a current for driving the servomotor in accordance with the current command outputted from the velocity control processing section; acceleration detecting means for detecting an acceleration of the driven element; a velocity estimation processing section for estimating the velocity of the driven element based on the detected acceleration by the acceleration detecting means; and correcting means for correcting the current command based on the estimated velocity by the velocity estimation processing section.

According to still another aspect of the invention, the controller comprises: velocity detecting means for detecting the velocity of the driven element; a velocity control processing section for controlling the velocity of the driven element based on the velocity command and the detected velocity by the velocity detecting means and outputting a current command; a current control processing section for controlling a current for driving the servomotor in accordance with the current command outputted from the velocity control processing section; acceleration detecting means for detecting an acceleration of the driven element; and a velocity estimation processing section for estimating the velocity of the driven element based on the detected acceleration by the acceleration detecting means; and correcting means for correcting the current command based on a product by multiplying the estimated velocity by a predetermined coefficient, and also a product by multiplying the detected acceleration by a predetermined coefficient.

According to still another aspect of the invention, the controller comprises: velocity detecting means for detecting a velocity of a driven element driven by the servomotor; a velocity control processing section for controlling the velocity of the driven element based on the velocity command and the detected velocity by the velocity detecting means and outputting a current command; a current control processing section for controlling a current for driving the servomotor in accordance with the current command outputted from the velocity control processing section; acceleration detecting means for detecting an acceleration of the driven element; a velocity estimation processing section for estimating the velocity of the driven element based on the detected acceleration by the acceleration detecting means; and correcting means for correcting the current command based on a product by multiplying a difference between the velocity command and the estimated velocity by a predetermined coefficient, and also a product by multiplying the detected acceleration by a predetermined coefficient.

The controller may further comprise a position control processing section for controlling a position of the driven element based on a position command designating a position of the driven element and a detected position of the driven element having a term for integrating a position deviation between the position command and the detected position. With this arrangement, an influence of steady-state deviations caused by the detected acceleration and/or the estimated velocity are removed.

According to still another aspect of the invention, the controller comprises: velocity detecting means for detecting the velocity of the driven element; a velocity control processing section for controlling the velocity of the driven element based on the velocity command and the detected velocity by the velocity detecting means; acceleration detecting means for detecting an acceleration of the driven element; a velocity estimation processing section for estimating the velocity of the driven element based on the detected acceleration by the acceleration detecting means; and a filter for removing steady-state components of the estimated velocity, wherein the velocity command or the detected velocity is corrected based on an output of the filter.

According to still another aspect of the invention, the controller comprises: velocity detecting means for detecting the velocity of the driven element; a velocity control processing section for controlling the velocity of the driven element based on the velocity command and the detected velocity by the velocity detecting means; acceleration detecting means for detecting an acceleration of the driven element; a velocity estimation processing section for estimating the velocity of the driven element based on the detected acceleration by the acceleration detecting means; and a filter for converging the estimated velocity into a value of the velocity command value, wherein the velocity command or the detected velocity is corrected based on an output of the filter.

The detected acceleration by the acceleration detecting means may be subjected to processing by a band-pass filter.

According to still another aspect of the invention, the controller comprises: velocity detecting means for detecting the velocity of the driven element; a velocity control processing section for controlling the velocity of the driven element based on the velocity command and the detected velocity by the velocity detecting means and outputting a current command; current detecting means for detecting a current for driving the servomotor; a current control processing section for controlling the current based on the current command outputted from the velocity control processing section and the detected current by the current detecting means; acceleration detecting means for detecting an acceleration of the driven element; correcting means for correcting the velocity command or the current command based on the detected acceleration by the acceleration detecting means; and means for changing a magnitude of the correction by the correcting means according to a signal from a host controller.

According to still another aspect of the invention, the controller comprises: velocity detecting means for detecting the velocity of the driven element; a velocity control processing section for generating a current command based on the velocity command and the detected velocity by the velocity detecting means; current detecting means for detecting a current for driving the servomotor; a current control processing section for controlling the current based on the current command outputted from the velocity control processing section and the detected current by the current detecting means; acceleration detecting means for detecting an acceleration of the driven element; correcting means for correcting the velocity command or the current command based on the detected acceleration by the acceleration detecting means, and means for selectively nullifying the correction by the correcting means according to a signal from a host controller.

The signal from the host controller may be outputted in accordance with an external signal or a program command. The signal from the host controller may be outputted in dependence on whether or not the servomotor is controlled to perform a cutting feed in a machine tool, and may be outputted in a stopped state of the servomotor.

According to still another aspect of the invention, the controller controls the servomotor in accordance with a position command designating a position of the driven element and comprises: position detecting means for detecting the position of the driven element; acceleration detecting means for detecting an acceleration of the driven element; a position estimation processing section for estimating the position of the driven element based on the detected acceleration by the acceleration detecting means; and a position control processing section for controlling the position of the driven element based on the position command, the estimated position by the position estimation processing section and the detected position by the position detecting means.

The controller may constitute a tandem control system in which the driven element is driven by a plurality of servomotors.

Since there is little noise or phase change, the acceleration detecting means can make correction to restrain vibration of the driven element in accordance with more accurate acceleration information. Since the setting position of the acceleration detecting means can be selected, in particular, the vibration of the driven element can be restrained accurately with high response by locating the detecting means in a position where the vibration of the driven element is expected to be restrained. Further, processing time for the correction can be shortened, since correction processing can be executed with a position/velocity control period longer than a current control period.

DETAILED DESCRIPTION

Figure 1:
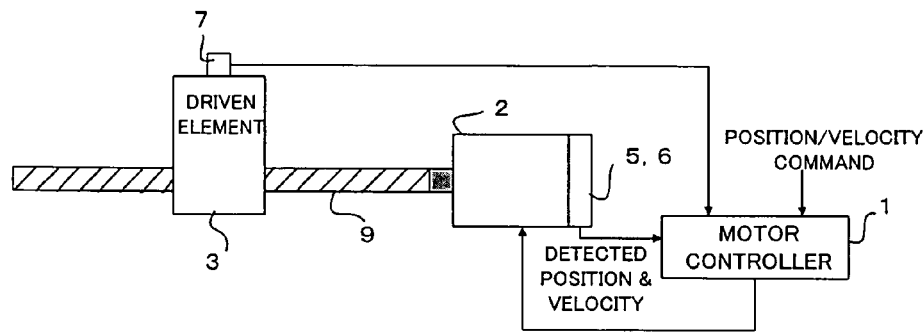
FIG. 1 is a schematic diagram illustrating an outline of the present invention.

FIG. 1 is a schematic diagram illustrating an outline of the present invention.

In the present invention, a driven body 3 to be driven by a servomotor 2 is provided with acceleration detecting means 7. A detected acceleration value detected by the acceleration detecting means 7 is inputted to a motor controller 1. The motor controller 1 is also supplied with detected position and velocity values from position detecting means 6 and velocity detecting means 5 for detecting the position and velocity, respectively, of the driven element 3. Further, position and velocity commands are inputted, whereupon the motor controller 1 performs position/velocity control and current control, thereby drivingly controlling the servomotor 2. In FIG. 1, numeral 9 denotes a ball screw/nut mechanism, which converts a rotary motion of the servomotor into a linear motion, thereby driving the driven element.

Figure 16:
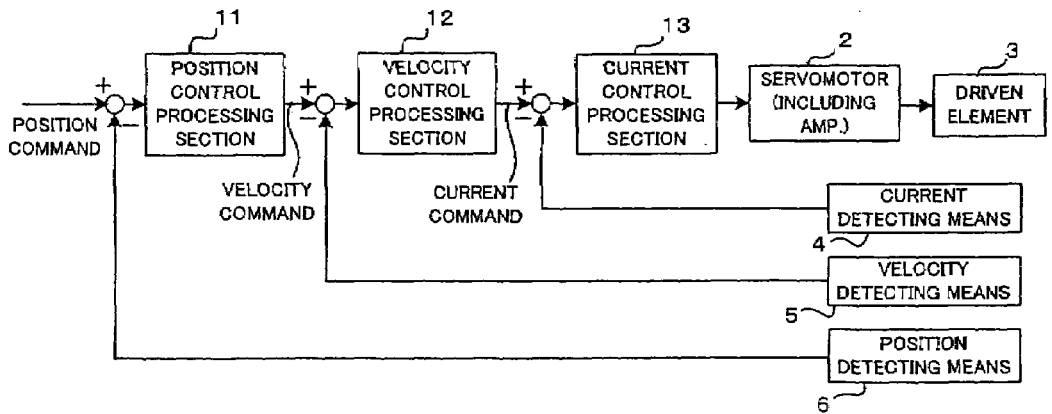
FIG. 16 is a block diagram showing conventional servomotor control.

In controlling the position and velocity of the driven element 3, the motor controller 1 is provided with a position control processing section 11, a velocity control processing section 12, and a current control processing section 13, as shown in FIG. 16. Position loop control, velocity loop control, and current loop control are performed in accordance with detected position and velocity signals from the position detecting means 6 and the velocity detecting means 5. In performing only the velocity control without carrying out the position control, the position control processing section 11 and the position detecting means 6 shown in FIG. 16 need not be provided.

As the aforesaid control processing for the position, velocity, and current is performed, in the present invention, vibration of the driven element 3 is prevented by correcting position, velocity, and current commands, etc. in accordance with the detected acceleration value from the acceleration detecting means 7. In the example shown in FIG. 1, the detecting means for detecting the position and velocity are attached to the servomotor, and the position and velocity of the driven element are detected by detecting the position and velocity of the servomotor. Naturally, additional means may be provided for directly detecting the position and velocity of the driven element 3.

Figure 2:
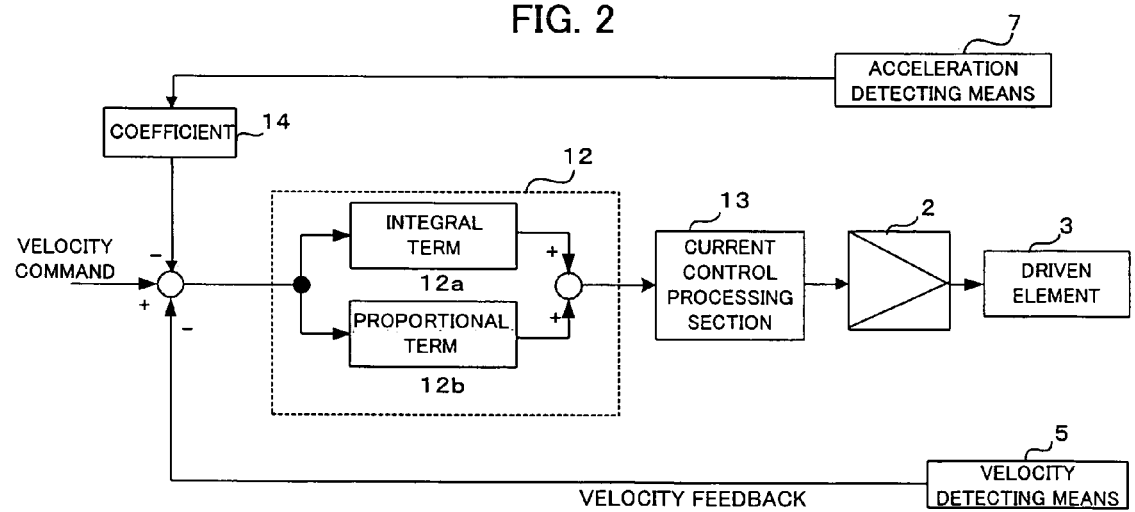
FIG. 2 is a schematic block diagram showing servomotor control according to a first embodiment of the invention.

FIG. 2 is a schematic block diagram showing servomotor control according to a first embodiment of the invention. In this first embodiment, velocity commands are corrected based on detected acceleration values detected by the acceleration detecting means 7.

A velocity deviation is obtained by subtracting a velocity feedback value, an output of the velocity detecting means 5, from a velocity command outputted from the position control processing section or a velocity command issued from a host controller or the like. As this is done, the velocity command is corrected by also subtracting a value obtained by multiplying a detected acceleration value from the acceleration detecting means 7 for detecting the acceleration of the driven element 3 by a predetermined coefficient 14. Alternatively, correction may be made by subtracting the product of the detected acceleration value and the coefficient 14 from the velocity command, by subtracting the product from a velocity deviation or the difference between the velocity command and the velocity feedback value, or by adding the product to the velocity feedback value. After all, a command inputted to the velocity control processing section 12 is corrected by the detected acceleration value. These methods are substantially the same as the correction of the velocity command.

In the velocity control processing section 12, velocity control processing is executed to obtain a current command in accordance with the command (corrected velocity deviation) inputted in this manner. In the first embodiment shown in FIG. 2, the velocity control is based on PI (proportional plus integral) control with an integral term 12a and a proportional term 12b. Alternatively, however, the control in the velocity control processing section 12 may be composed of IP (integral plus proportional) control or PID (proportional plus integral plus derivative) control. The present embodiment is characterized in that the velocity command is corrected based on the detected acceleration value.

If the driven element is accelerated suddenly so that the detected acceleration value outputted from the acceleration detecting means 7 increases, the velocity command is reduced by a value obtained by multiplying the detected acceleration value by a coefficient and acts so as to reduce the acceleration. Besides, integral control of the velocity control serves to correct a delay in communication for capturing the detected acceleration value and a delay from the current command input to the start of movement of the driven element. Thus, bad influences of delays can be restrained, so that generation of vibration can be prevented efficiently.

Current control processing of the current control processing section 13 in the motor control section 1 is carried out in the same manner as aforesaid, and subsequent processing operations of the velocity control processing section 12 resemble the conventional operations for servomotor control processing. If the position control is also performed, the position control processing section performs position loop control and outputs velocity commands in the conventional manner.

In the present embodiment, the velocity commands are corrected based on the detected acceleration values, and this correction processing is executed for each velocity control period. Since the velocity control period is longer than a current control period, therefore, the processing time can be made shorter than in the case of the invention described in JP 6-91482A where correction processing based on detected acceleration values is performed together with current control processing.

Figure 3:
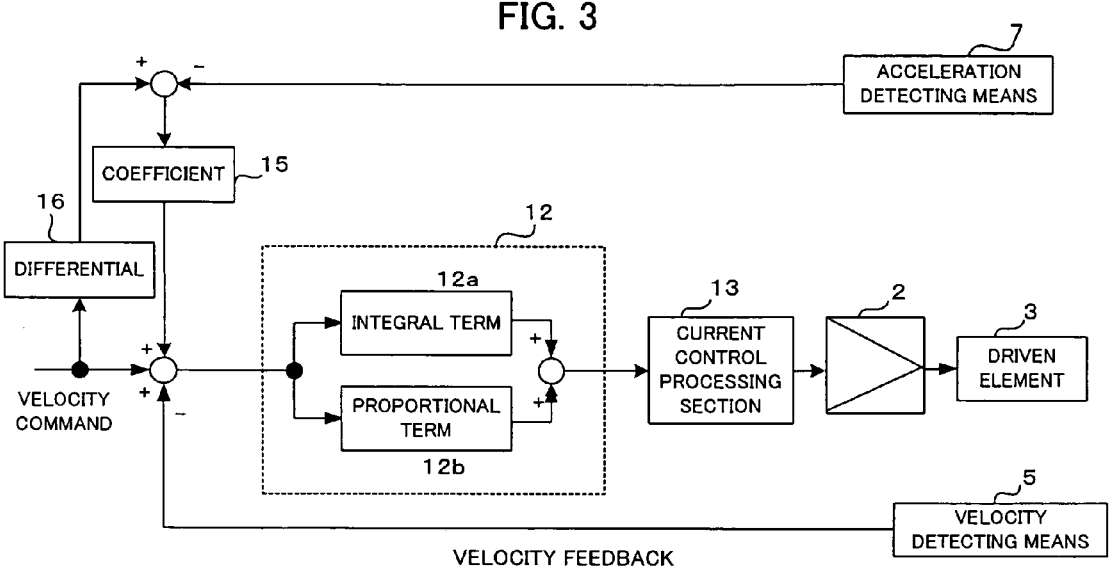
FIG. 3 is a schematic block diagram showing servomotor control according to a second embodiment of the invention.

FIG. 3 is a schematic block diagram showing a second embodiment of the present invention. This second embodiment differs from the first embodiment shown in FIG. 2 in the contents of correction of velocity commands. In the second embodiment, a command acceleration is obtained by subjecting a velocity command to first-order differentiation with a differential term 16, and an acceleration deviation is obtained by subtracting a detected acceleration value detected by the acceleration detecting means 7 from the command acceleration. A correction amount is obtained by multiplying the acceleration deviation by a coefficient 15, and it is added to the velocity command. This processing is executed together with velocity control processing. This processing shares other details with the conventional servo control.

The difference between the command acceleration obtained from the velocity command and the detected acceleration value detected by the acceleration detecting means 7 is the difference between a command acceleration and an actual acceleration, and is obtained by subtracting an actually needed acceleration (command acceleration) from the detected acceleration value. This difference represents an acceleration that is generated by the vibration of the driven element 3. The vibration is restrained more efficiently by correcting the velocity command in accordance with the acceleration generated by the vibration.

Figure 4:
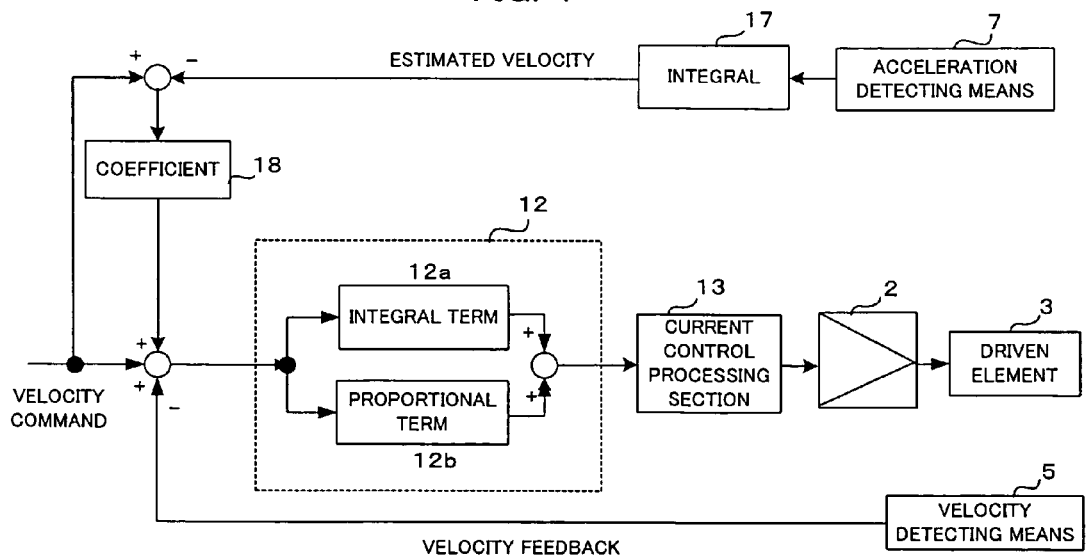
FIG. 4 is a schematic block diagram showing servomotor control according to a third embodiment of the invention.

FIG. 4 is a schematic block diagram showing a third embodiment of the present invention.

This third embodiment is provided with a velocity estimation processing section 17, which integrates a detected acceleration value detected by the acceleration detecting means 7, thereby obtaining an estimated velocity value for correction of a velocity command. A velocity deviation is obtained by subtracting the estimated velocity value obtained by the velocity estimation processing section 17 from the velocity command, and a correction amount is obtained by multiplying the velocity deviation by a coefficient 18. This correction amount is added to the velocity command to correct it or a velocity feedback value. This correction processing is performed together with velocity control processing for each velocity control period. If the control in the velocity control processing section is the PI (proportional plus integral) control or PID (proportional plus integral plus derivative) control, there is no substantial difference in effect between the correction of the velocity command based on the detected acceleration value and the correction of the velocity feedback value outputted from the velocity detecting means. In the case of the IP (integral plus proportional) control, however, proportional control in the velocity control processing section acts on the velocity feedback value only. If the velocity command is corrected, therefore, correction exerts an effect on only integral control in the velocity control processing section 12, but not on proportional control. If the velocity feedback value is corrected, moreover, correction based on the detected acceleration value affects both the proportional and integral controls. For the case of the IP control, therefore, the velocity command or the velocity feedback value, whichever may be suitable, is selected as an object of the correction based on the detected acceleration value. Other controls, such as position control, current control, etc., are performed in the same manner as in the conventional case.

In the third embodiment, the velocity command is estimated based on the detected acceleration value detected by the acceleration detecting means 7, and the velocity deviation (estimated velocity deviation) or the difference between the velocity command and the estimated velocity is obtained. Since this velocity deviation indicates the difference between a command velocity and an actual velocity, however, the command velocity can be obtained by correcting the velocity deviation with a correction amount based on the obtained velocity deviation (estimated velocity deviation). Thus, the velocity command is corrected and controlled so that the velocity deviation caused by the vibration of the driven element 3 is canceled, so that the vibration of the driven element 3 can be restrained.

Figure 5:
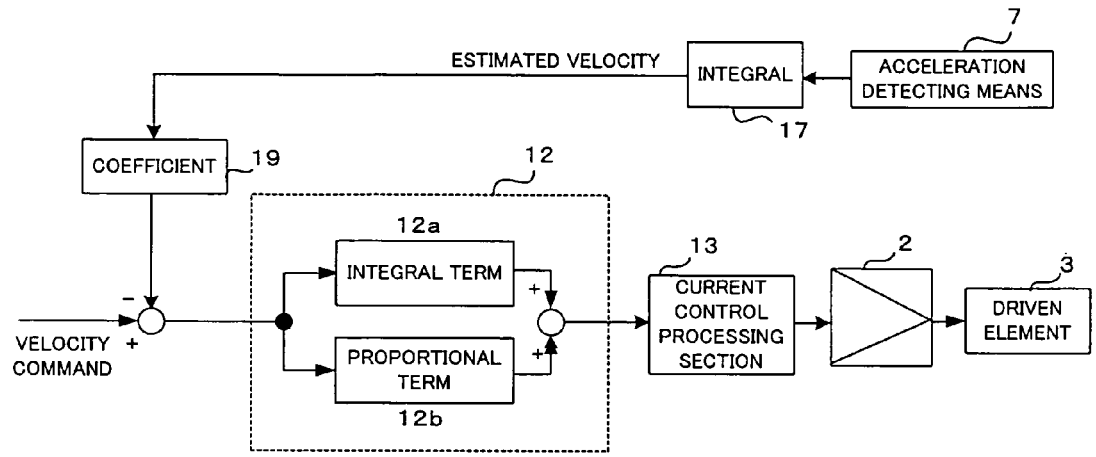
FIG. 5 is a schematic block diagram showing servomotor control according to a fourth embodiment of the invention.

FIG. 5 is a schematic block diagram showing a fourth embodiment of the present invention.

This fourth embodiment is provided with a velocity estimation processing section 17, which integrates a detected acceleration value detected by the acceleration detecting means, thereby obtaining an estimated velocity value. The velocity control processing section 12 performs velocity control processing using the product of a coefficient 19 and the estimated velocity value obtained by the velocity estimation processing section 17 as a velocity feedback value. In this case, no velocity detecting means is needed.

Figure 6:
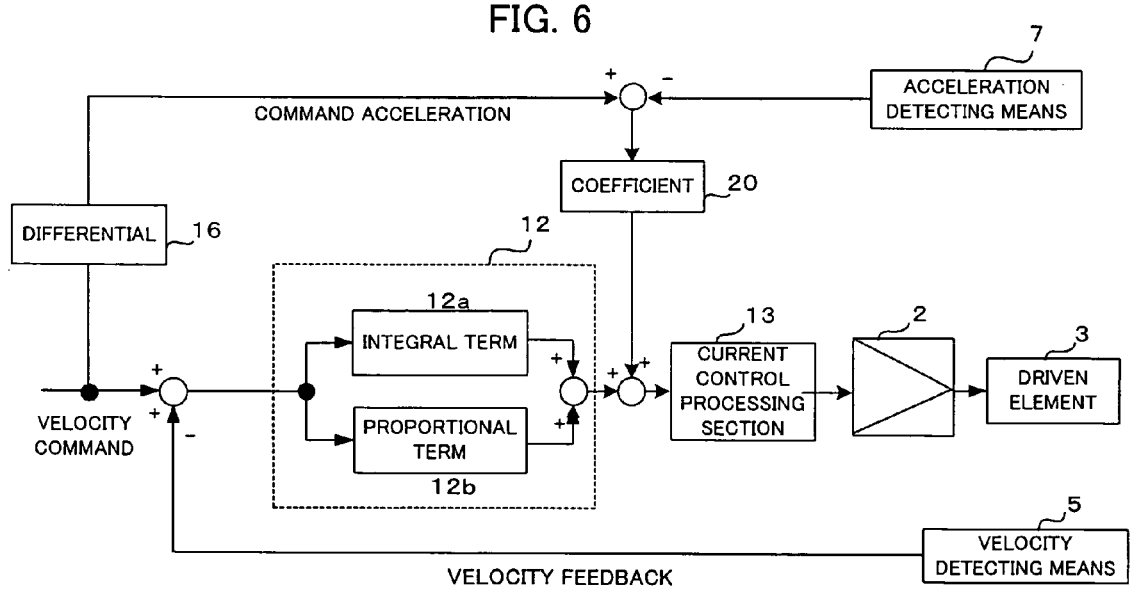
FIG. 6 is a schematic block diagram showing servomotor control according to a fifth embodiment of the invention.

FIG. 6 is a schematic block diagram showing a fifth embodiment of the present invention.

In this fifth embodiment, unlike the first to fourth embodiments described above, a current command outputted from the velocity control processing section 12 is corrected. A command acceleration is obtained by subjecting a velocity command to first-order differentiation with the differential term 16, and an acceleration deviation is obtained by subtracting a detected acceleration value detected by the acceleration detecting means 7 from the command acceleration. A correction amount is obtained by multiplying the acceleration deviation by a coefficient 20, and correction is made by adding this correction amount to the current command obtained by velocity control processing in the velocity control processing section 12. This current command correction is also executed together with the velocity control processing for each velocity control period.

In this fifth embodiment, the value obtained as the acceleration deviation is an acceleration component generated by vibration of the driven element 3, and this vibration is restrained by correcting the acceleration deviation into the current command.

Figure 7:
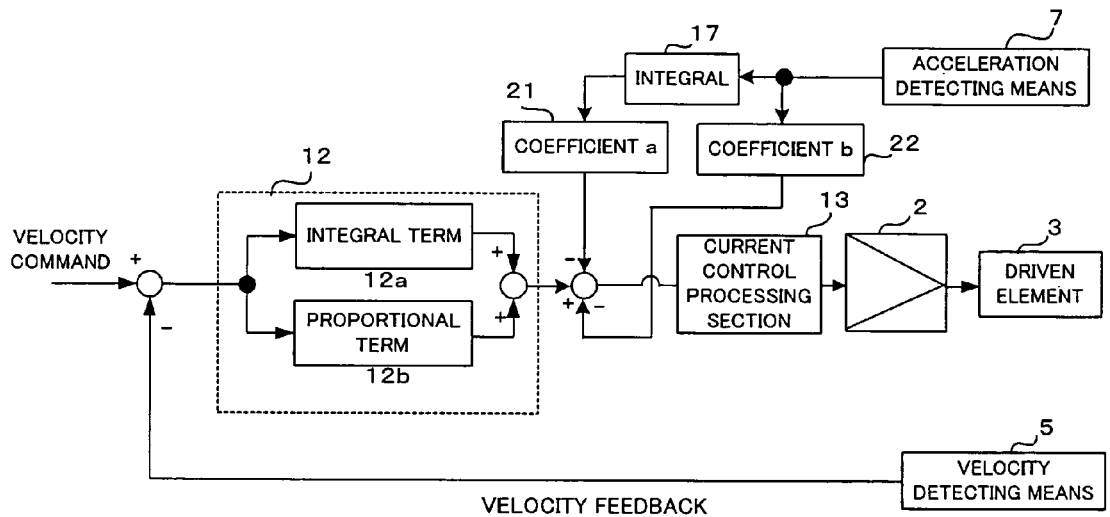
FIG. 7 is a schematic block diagram showing servomotor control according to a sixth embodiment of the invention.

FIG. 7 is a schematic block diagram showing a sixth embodiment of the present invention.

This sixth embodiment is provided with a velocity estimation processing section 17, which integrates a detected acceleration value detected by the acceleration detecting means 7, thereby obtaining an estimated velocity value. Correction is made by subtracting the product of a coefficient "a" (numeral 21) and the estimated velocity value outputted from the velocity estimation processing section 17 and the product of a coefficient "b" (numeral 22) and the detected acceleration value from a current command obtained by velocity control processing in the velocity control processing section 12. The corrected current command is outputted to a servo amplifier. Also in this case, the processing for correcting the current command is executed for each velocity control period, and the current command obtained by the velocity control processing is corrected for each period.

In this sixth embodiment, the correction based on the correction amount obtained by multiplying the detected acceleration value by the coefficient b cannot restrain influences of a delay attributable to the capture of the detected acceleration value and a delay from the current command input to the start of movement of the driven element cannot be restrained alone. However, the delays can be efficiently corrected to prevent generation of vibration by correction based on the correction amount obtained by multiplying the estimated velocity value by the coefficient a (numeral 21).

Figure 8:
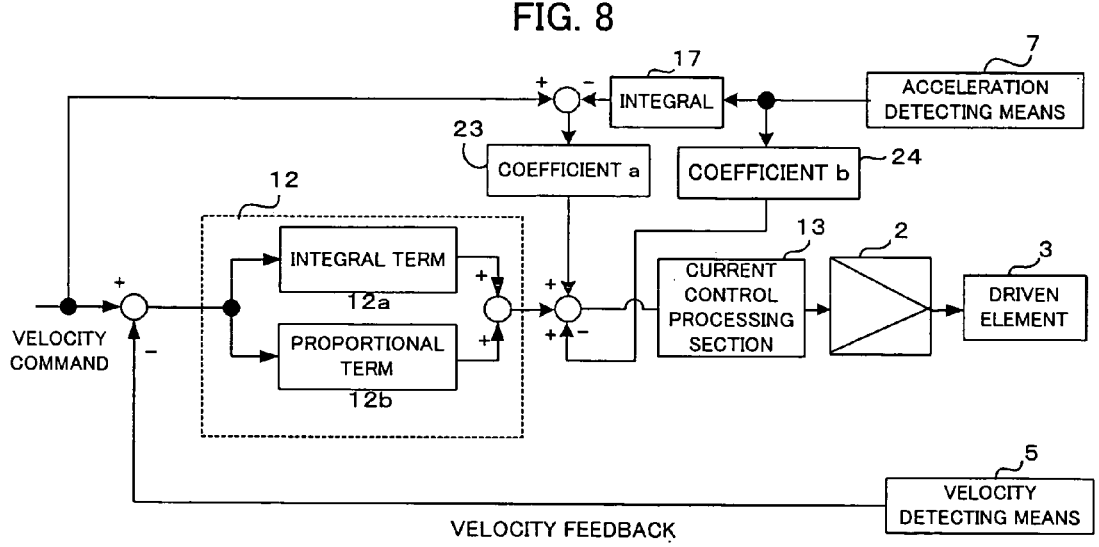
FIG. 8 is a schematic block diagram showing servomotor control according to a seventh embodiment of the invention.

FIG. 8 is a schematic block diagram showing a seventh embodiment of the present invention.

This seventh embodiment is provided with a velocity estimation processing section 17, which integrates a detected acceleration value detected by the acceleration detecting means 7, thereby obtaining an estimated velocity value. Further, the difference between a command velocity and the estimated velocity value is obtained. A first correction amount is obtained by multiplying this difference by a coefficient a (numeral 23), and a second correction amount is obtained by multiplying the detected acceleration value by a coefficient b (numeral 24). The first correction amount is added to a current command obtained by velocity control processing in the velocity control processing section 12, and the second correction amount is subtracted from the current command. This processing shares other details with the conventional servo control.

In the seventh embodiment, the first and second correction amounts of the correction based on the detected acceleration value can restrain influences of delays, thereby inhibiting vibration.

Figure 9:
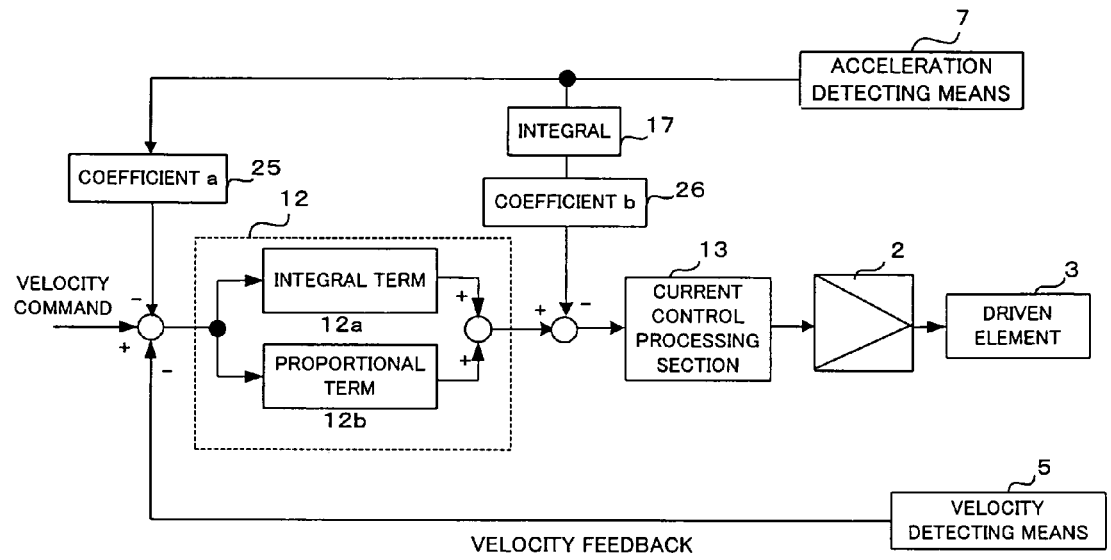
FIG. 9 is a schematic block diagram showing servomotor control according to an eighth embodiment of the invention.

FIG. 9 is a schematic block diagram showing an eighth embodiment of the present invention.

In this eighth embodiment, a velocity estimation processing section 17 is added to the first embodiment so that a current command can be also corrected based on an estimated velocity value. A corrected value of a velocity command is obtained by multiplying a detected acceleration value detected by the acceleration detecting means 7 by a coefficient a (numeral 25), and velocity control processing is performed with use of a corrected velocity command obtained by subtracting the corrected value from the velocity command. Further, the detected acceleration value is integrated to obtain the estimated velocity value by the velocity estimation processing section 17, and a corrected value of the velocity command is obtained by multiplying the estimated velocity value by a coefficient b (numeral 26). The resulting value is subtracted from the current command obtained by the velocity control processing in the velocity control processing section 12.

Figure 10:
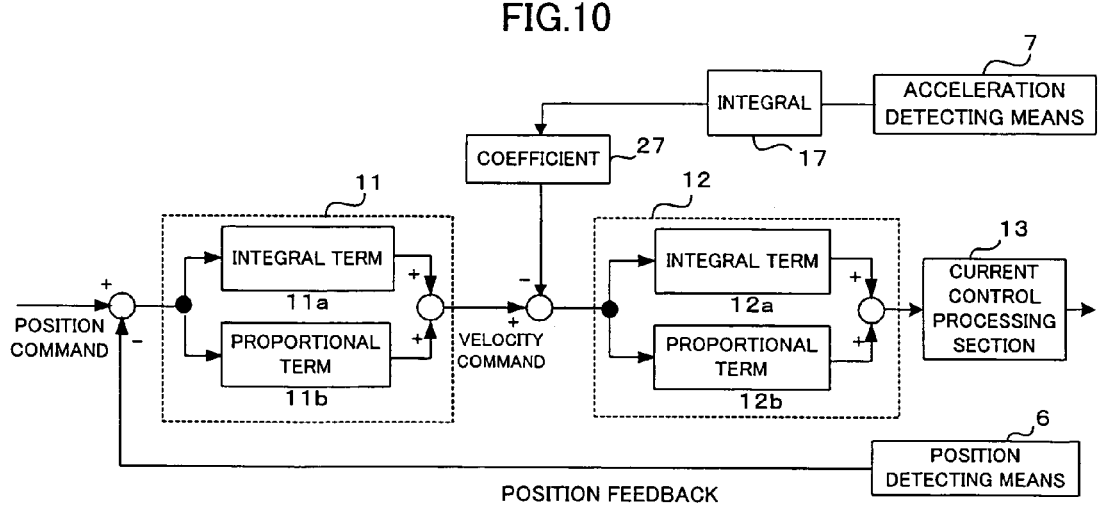
FIG. 10 is a schematic block diagram showing servomotor control according to a ninth embodiment of the invention.

FIG. 10 is a schematic block diagram showing a ninth embodiment of the present invention.

If control is performed to correct a velocity command or a current command based on a detected acceleration value or an estimated velocity value obtained from the detected acceleration value, in the first to eighth embodiments described above, an integral of the detected acceleration value sometimes may fail to become zero when the driven element returns to its original position after reciprocation. When the motion of the driven element reaches a fixed velocity, on the other hand, the integral of the detected acceleration value may be subjected to a steady-state deviation without becoming zero, in some cases. This ninth embodiment is intended to prevent these awkward situations. To attain this, the position control processing section 11 is provided with an integral term 11a for integral processing, in addition to a proportional term 11b.

In the example shown in FIG. 10, a position control processing section 11 with an integral term 11a is provided in the fourth embodiment shown in FIG. 5. A steady-state deviation that is caused by correction based on the detected acceleration value and/or the estimated velocity value can be restrained by outputting the velocity command from the position control processing section 11 so that a position deviation can be canceled by the processing of the integral term 11a in the position control processing section 11.

Figure 11:
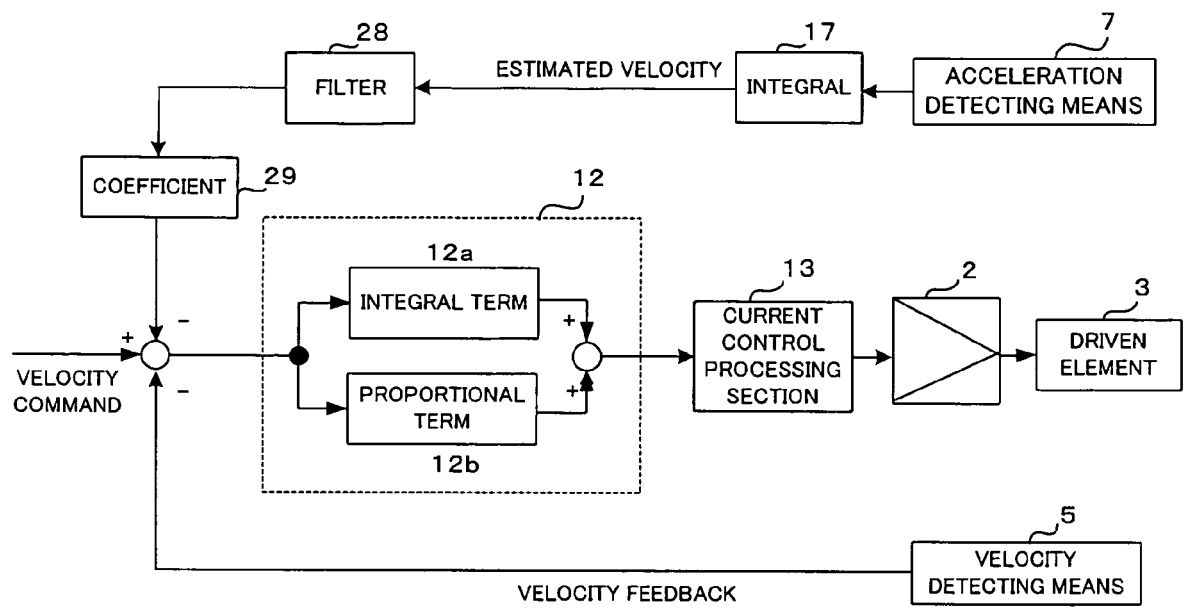
FIG. 11 is a schematic block diagram showing servomotor control according to a tenth embodiment of the invention.

FIG. 11 is a schematic block diagram showing a tenth embodiment of the present invention.

In this tenth embodiment, a detected acceleration value detected by the acceleration detecting means 7 is integrated to obtain an estimated velocity value in the velocity estimation processing section 17, and this estimated velocity value is filtered by a filter 28. The velocity control processing section 12 executes velocity control processing based on the product of the output value of the filter 28, a velocity command, and a velocity feedback value. The velocity command is corrected in the example shown in FIG. 11. If the control in the velocity control processing section is the PI (proportional plus integral) control or PID (proportional plus integral plus derivative) control, there no difference between correction of the velocity command and correction of the velocity feedback. If the velocity command is corrected in the IP (integral plus proportional) control, however, the correction influences only the integral control of the velocity control. If the velocity feedback is corrected, on the other hand, the correction influences both the proportional control and the integral control. In the case of the IP control, therefore, either the velocity command or the velocity feedback is selected as an object of correction. Further, steady-state components of the estimated velocity value are removed by the filter 28 that is configured for the purpose of the removal. If the filter 28 is configured so as to converge the estimated velocity value into a velocity command value, moreover, the follow-up property for the velocity command can be improved.

In the first to ninth embodiment described above, furthermore, the output of the acceleration detecting means may be passed through a band-pass filter that transmits a natural frequency region of the driven element 3 so that the correction can be corrected with use of the filtered acceleration detecting means. By doing this, the vibration components of the driven element 3 can be removed more accurately.

Figure 12:
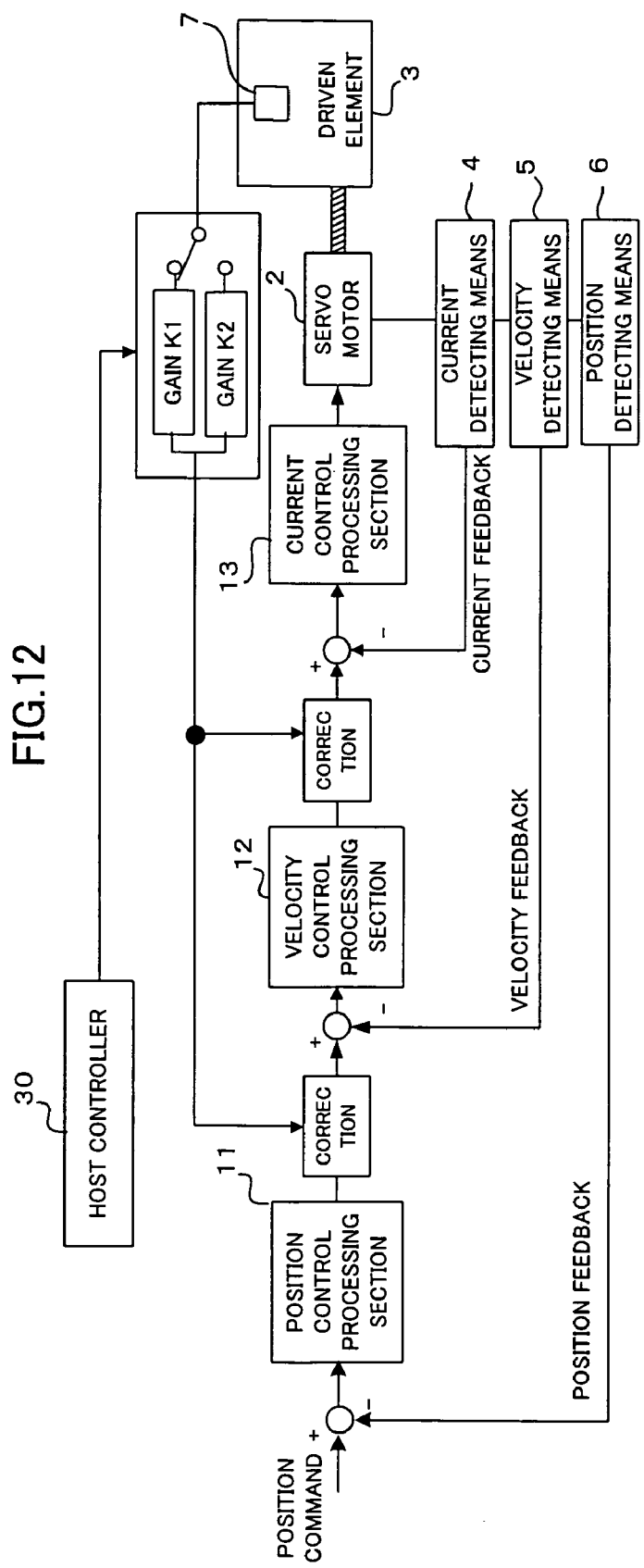
FIG. 12 is a schematic block diagram showing servomotor control according to an eleventh embodiment of the invention.

FIG. 12 is a schematic block diagram showing an eleventh embodiment of the present invention.

In this eleventh embodiment, a feedback gain of a detected acceleration value detected by the acceleration detecting means 7 can be changed in response to a command from a host controller 30.

During a cutting mode of a machine tool, the driven element (table or tool for holding a workpiece) 3 is subjected to a cutting reaction force, so that the tool is subject to conditions and circumstances different from those for a fast feed mode. To meet this situation, therefore, this embodiment is configured to be able to change influences of correction based on the detected acceleration value.

In this eleventh embodiment, which is applicable to the foregoing first to tenth embodiments, the feedback gain of the detected acceleration value is changed. In the example shown in FIG. 12, this embodiment is applied to the eighth embodiment shown in FIG. 9 in which both velocity and current commands are corrected. Alternatively, the eleventh embodiment may be applied to any other embodiments.

An operator or the like externally inputs a gain select command signal to the host controller 30 or previously incorporates a gain select command into a machining program or the like. If this is done, the gain select command can be outputted as this program is executed. Alternatively, the host controller 30 may determine the mode command of the machine tool, whether a cutting command or a fast feed command, whereupon the gain select command is outputted. The mode command can be determined based on a program command. Further, the gain select command is executed when the movement of the driven element 3 is stopped, that is, when the motion of the servomotor 2 is stopped. Since the stop state is established as the operation mode is changed from the cutting mode to the fast feed mode or vice versa, the gain select command is outputted in the stop state.

A gain select command for selecting a gain K1 is outputted from the host controller 30 to select the gain K1, and the detected acceleration value detected by the acceleration detecting means 7 is multiplied by the gain K1. Based on the product of the gain K1 and the detected acceleration value, a velocity command and or a current command is corrected in the same manner as in the foregoing first to tenth embodiments. When a gain select command for selecting a gain K2 is outputted from the host controller, on the other hand, the velocity command and or the current command is corrected based on the product of the gain K2 and the detected acceleration value, as in the first to tenth embodiments.

Figure 13:
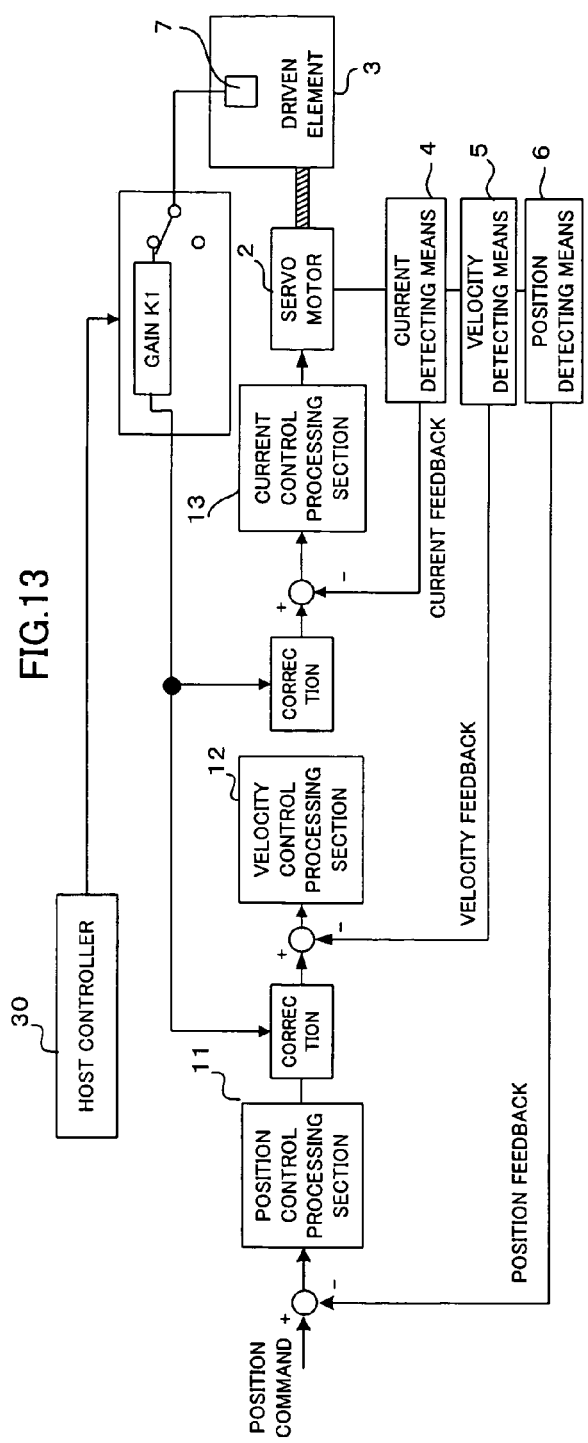
FIG. 13 is a schematic block diagram showing servomotor control according to a twelfth embodiment of the invention.

FIG. 13 is a schematic block diagram showing a twelfth embodiment of the present invention.

In response to a command from the host controller 30, in this twelfth embodiment, it can be determined whether or not a velocity command and/or a current command is corrected based on a detected acceleration value detected by the acceleration detecting means 7. This corresponds to the case where the selected one of the gains according to the eleventh embodiment shown in FIG. 12, e.g., the gain K2, is "0". The twelfth embodiment differs from the eleventh embodiment only in that the one gain K2 is "0".

Figure 14:
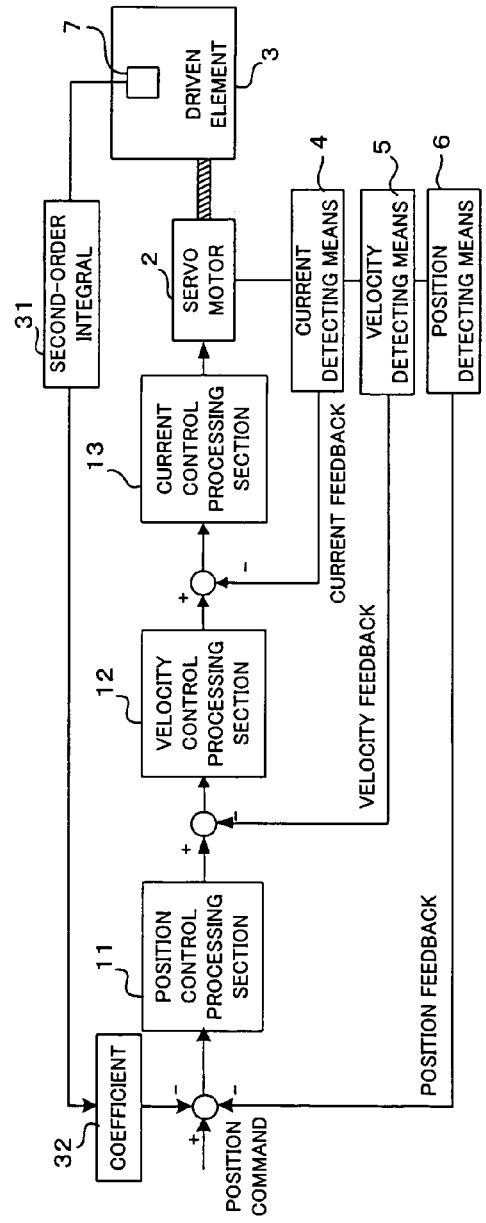
FIG. 14 is a schematic block diagram showing servomotor control according to a thirteenth embodiment of the invention.

FIG. 14 is a schematic block diagram showing a thirteenth embodiment of the present invention.

In this thirteenth embodiment, a position control processing section 11 is provided for servo control of the motor control section 1, and a position command is corrected by a detected acceleration value detected by the acceleration detecting means 7. The thirteenth embodiment is provided with a position estimation processing section 31 that obtains an estimated position by subjecting the detected acceleration value to second-order integration. Correction is made by subtracting the product of a coefficient 32 and the estimated position obtained in the position estimation processing section 31 from the position command. Normally, proportional control is performed in the position control processing section 11, and a position deviation is obtained by subtracting a feedback value from the position detecting means 6 from the position command. A velocity command is obtained by multiplying the position deviation by a position gain (proportional gain). Thus, a velocity command for a correction margin of the position command based on the detected acceleration value is generated by multiplying the correction margin by the position gain. After all, the velocity command is corrected in the same manner as in the first embodiment.

Based on the aforesaid relationship between the position command and the velocity command, moreover, the velocity command is correction in the first to fourth embodiments. However, the position may be corrected instead of correcting the velocity command. The velocity and position commands should only be corrected with use of different coefficients.

FIG. is a schematic block diagram showing a fourteenth embodiment of the present invention.

A controller according to this fourteenth embodiment is an example of a device that executes correction control based on the detected acceleration value of the present invention for tandem control in which one driven element is driven by a plurality of (or two in this embodiment) servomotors.

Figure 15:
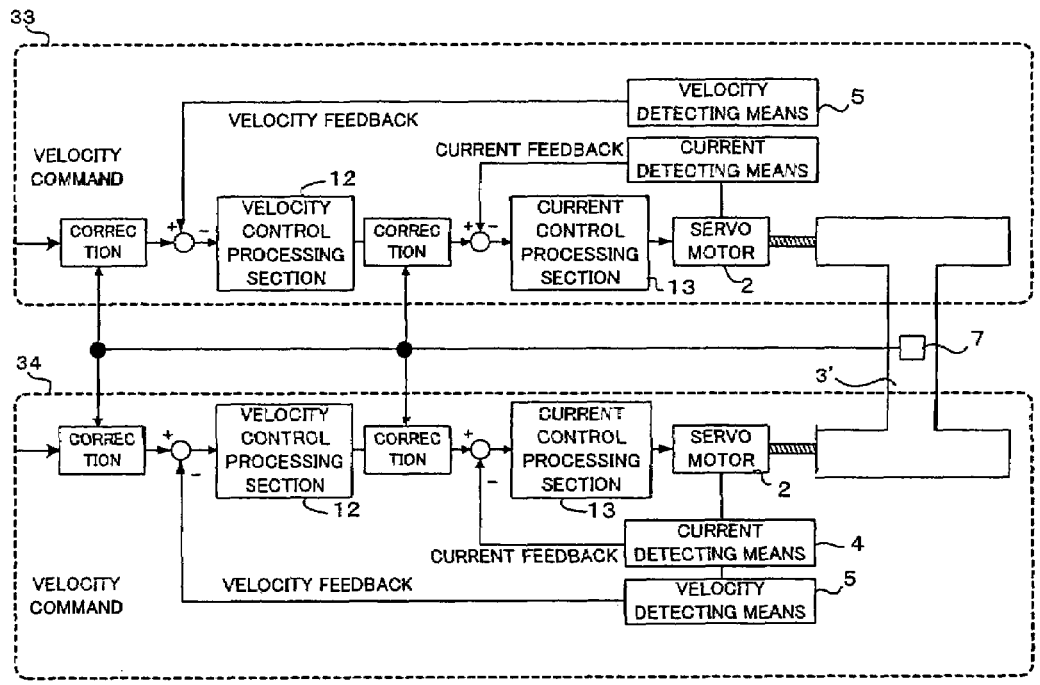
FIG. 15 is a schematic block diagram showing servomotor control according to a fourteenth embodiment of the invention.

The example shown in FIG. 15 has two control systems, a master axis control system 33 and a slave axis control system 34, and on driven element 3' is drivingly controlled by servomotors 2 for the individual control systems. In this example, both the master and slave axes control systems 33 and 34 perform velocity control and current control. The device is additionally provided with a position control processing section 11 when position control is required. Respective motor controller of the servomotors 2 in the master and slave axis control systems 33 and 34, individually, have the configuration of each of the foregoing embodiments shown in FIGS. 2 to 14. In the example shown in FIG. 15, both the master and slave axis control systems 33 and 34 are subjected to the motor control of the eighth embodiment shown in FIG. 9, and correction is made based on a velocity command, current command, and detected acceleration value. The first to fourth embodiments shown in FIGS. 2 to 5 or the tenth embodiment shown in FIG. 11 may be applied to the control of servomotors 2 for the master and slave axis control systems 33 and 34. In this case, the velocity command is corrected based on the detected acceleration value. Alternatively, the fifth to seventh embodiments shown in FIGS. 6 to 8 or the ninth embodiment shown in FIG. 10 may be applied so that the current command is corrected based on the detected acceleration value. As in the thirteenth electron beam shown in FIG. 14, moreover, the position command may be corrected for the servomotor control based on the detected acceleration value.

As shown in FIG. 15, moreover, the tandem control may be configured so that whether or not to correct position, velocity command, and current commands based on the detected acceleration value or the magnitude of correction, if any, or the magnitude of each gain based on the detected acceleration value can be selected or changed.

Although the PI control is performed in the velocity control processing section in each of the foregoing embodiments, the velocity control processing section may alternatively be configured for the IP or PID control.

The position, velocity, and current controls of the servomotors are normally executed by processors, and the position/velocity control period is longer than the current control period. In each of the embodiments of the present invention, the processing for correcting the position, velocity, and current commands based on the detected acceleration value is executed in the position control period that is longer than the current control period. By doing this, processing time for this correction is shortened. Since the correction time is short, the detected acceleration value can be obtained for each current period, and correction can be made based on an average value that is obtained for each position and velocity processing period, for example. Smooth acceleration correction can be achieved with use of this average.

Figure 17:
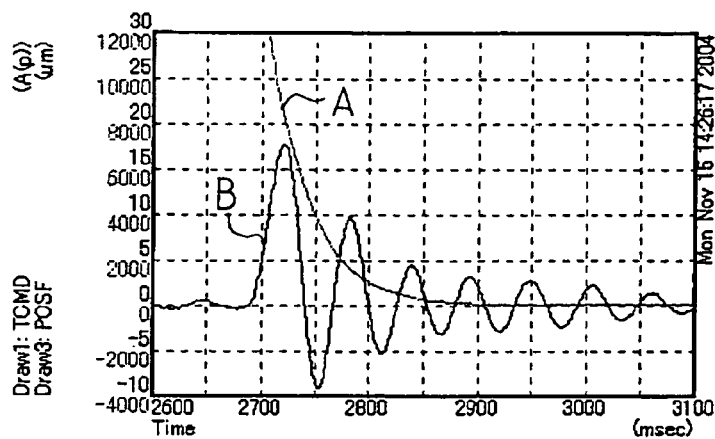
FIG. 17 is a diagram showing the result of an experiment for the case where a velocity control processing section performs PI (proportional plus integral) control.
Figure 18:
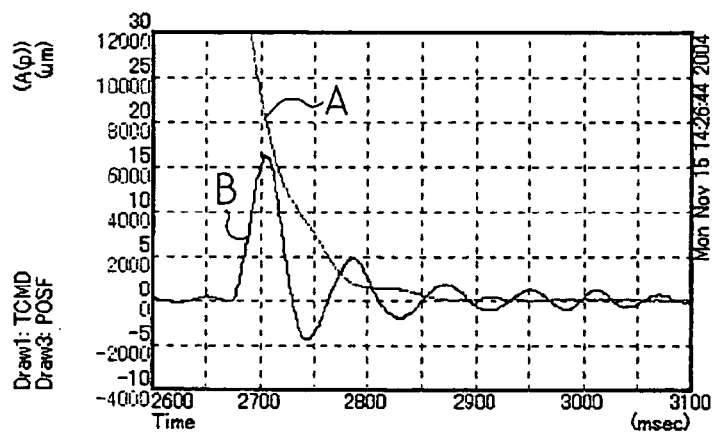
FIG. 18 is a diagram showing the result of an experiment according to the first embodiment of the invention.
Figure 19:
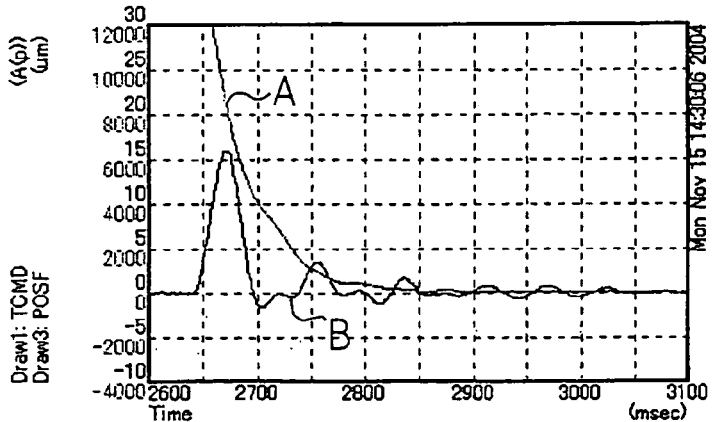
FIG. 19 is a diagram showing the result of an experiment according to the eighth embodiment of the invention.

FIG. 17 is a diagram showing the result of an experiment for the case where the velocity control by the velocity control processing section 12 without the correction based on the detected acceleration value according to the present invention is the PI control. FIG. 18 is a diagram showing the result of a similar experiment according to the first embodiment shown in FIG. 2. FIG. 19 is a diagram showing the result of a similar experiment according to the eighth embodiment shown in FIG. 9. In any of these drawings, symbol A represents a position of a driven element (servomotor), and symbol B represents the acceleration of the driven element. Comparison between FIGS. 17 and 18 indicates that vibration is restrained. This restraint effect is further enhanced in the case of the eighth embodiment shown in FIG. 19.

What is claimed is:

1. A controller for controlling a servomotor for driving a driven element in accordance with a velocity command designating a velocity of the driven element, comprising:
   velocity detecting means for detecting the velocity of the driven element;
   a velocity control processing section for controlling the velocity of the driven element based on the velocity command and the detected velocity by said velocity detecting means;
   acceleration detecting means for detecting an acceleration of the driven element;
   correcting means for correcting the velocity command based on the detected acceleration by said acceleration detecting means; and
   a current control processing section for controlling a current for driving the servomotor in accordance with a current command output from said velocity control processing section, and a velocity estimation processing section for estimating the velocity of the driven element based on the detected acceleration by said acceleration detecting means, and means for correcting the current command based on the estimated velocity.

2. A controller for controlling a servomotor for driving a driven element in accordance with a velocity command designating a velocity of the driven element, comprising:
   velocity detecting means for detecting the velocity of the driven element;
   a velocity control processing section for controlling the velocity of the driven element based on the velocity command and the detected velocity by said velocity detecting means;
   acceleration detecting means for detecting an acceleration of the driven element; and correcting means for correcting the velocity command value based on the detected acceleration by said acceleration detecting means and a first-order differential of the velocity command.

3. A controller for controlling a servomotor for driving a driven element in accordance with a velocity command designating a velocity of the driven element, comprising:
  velocity detecting means for detecting the velocity of the driven element;
  acceleration detecting means for detecting an acceleration of the driven element;
  a velocity estimation processing section for estimating the velocity of the driven element based on the detected acceleration by said acceleration detecting means; and
  a velocity control processing section for controlling the velocity of the driven element based on the velocity command, the estimated velocity by said velocity estimation processing section and the detected velocity by said velocity detecting means.

4. A controller for controlling a servomotor for driving a driven element in accordance with a velocity command designating a velocity of the driven element, comprising:
  velocity detecting means for detecting the velocity of the driven element;
  a velocity control processing section for controlling the velocity of the driven element based on the velocity command and the detected velocity by said velocity detecting means and outputting a current command;
  a current control processing section for controlling a current for driving the servomotor in accordance with the current command outputted from said velocity control processing section;
  acceleration detecting means for detecting an acceleration of the driven element; and
  correcting means for correcting the current command based on the detected acceleration by said acceleration detecting means and a first-order differential of the velocity command.

5. A controller for controlling a servomotor for driving a driven element in accordance with a velocity command designating a velocity of the driven element, comprising:
  velocity detecting means for detecting the velocity of the driven element;
  a velocity control processing section for controlling the velocity of the driven element based on the velocity command and the detected velocity by said velocity detecting means and outputting a current command;
  a current control processing section for controlling a current for driving the servomotor in accordance with the current command outputted from said velocity control processing section;
  acceleration detecting means for detecting an acceleration of the driven element;
  a velocity estimation processing section for estimating the velocity of the driven element based on the detected acceleration by the acceleration detecting means; and
  correcting means for correcting the current command based on the estimated velocity by said velocity estimation processing section.

6. A controller for drivingly controlling a servomotor for driving a driven element in accordance with a velocity command designating a velocity of the driven element, comprising:
  velocity detecting means for detecting the velocity of the driven element;
  a velocity control processing section for controlling the velocity of the driven element based on the velocity command and the detected velocity by said velocity detecting means and outputting a current command;
  a current control processing section for controlling a current for driving the servomotor in accordance with the current command outputted from said velocity control processing section;
  acceleration detecting means for detecting an acceleration of the driven element;
  a velocity estimation processing section for estimating the velocity of the driven element based on the detected acceleration by the acceleration detecting means; and
  correcting means for correcting the current command based on a product by multiplying the estimated velocity by a predetermined coefficient, and also a product by multiplying the detected acceleration by a predetermined coefficient.

7. A controller for controlling a servomotor for driving a driven element in accordance with a velocity command designating the velocity of the driven element, comprising:
  velocity detecting means for detecting a velocity of a driven element driven by the servomotor;
  a velocity control processing section for controlling the velocity of the driven element based on the velocity command and the detected velocity by said velocity detecting means and outputting a current command;
  a current control processing section for controlling a current for driving the servomotor in accordance with the current command outputted from said velocity control processing section;
  acceleration detecting means for detecting an acceleration of the driven element;
  a velocity estimation processing section for estimating the velocity of the driven element based on the detected acceleration by said acceleration detecting means; and
  correcting means for correcting the current command based on a product by multiplying a difference between the velocity command and the estimated velocity by a predetermined coefficient, and also a product by multiplying the detected acceleration by a predetermined coefficient.

8. A controller for controlling a servomotor for driving a driven element in accordance with a velocity command designating a velocity of the driven element, comprising:
  velocity detecting means for detecting the velocity of the driven element;
  a velocity control processing section for controlling the velocity of the driven element based on the velocity command and the detected velocity by said velocity detecting means;
  acceleration detecting means for detecting an acceleration of the driven element;
  a velocity estimation processing section for estimating the velocity of the driven element based on the detected acceleration by said acceleration detecting means; and
  a filter for removing steady-state components of the estimated velocity, wherein the velocity command or the detected velocity is corrected based on an output of said filter.

9. A controller for controlling a servomotor for driving a driven element in accordance with a velocity command designating a velocity of the driven element, comprising:
  velocity detecting means for detecting the velocity of the driven element;
  a velocity control processing section for controlling the velocity of the driven element based on the velocity command and the detected velocity by said velocity detecting means;

acceleration detecting means for detecting an acceleration of the driven element;

a velocity estimation processing section for estimating the velocity of the driven element based on the detected acceleration by said acceleration detecting means; and a filter for converging the estimated velocity into a value of the velocity command value, wherein the velocity command or the detected velocity is corrected based on an output of said filter.

10. A controller for controlling a servomotor for driving a driven element in accordance with a velocity command designating a velocity of the driven element, comprising:

velocity detecting means for detecting the velocity of the driven element;

a velocity control processing section for controlling the velocity of the driven element based on the velocity command and the detected velocity by said velocity detecting means and outputting a current command;

current detecting means for detecting a current for driving the servomotor;

a current control processing section for controlling the current based on the current command outputted from said velocity control processing section and the detected current by said current detecting means;

acceleration detecting means for detecting an acceleration of the driven element;

correcting means for correcting the velocity command or the current command based on the detected acceleration by said acceleration detecting means; and means for changing a magnitude of the correction by said correcting means according to a signal from a host controller.

11. A controller for controlling a servomotor for driving a driven element in accordance with a velocity command designating a velocity of the driven element, comprising:

velocity detecting means for detecting the velocity of the driven element;

a velocity control processing section for generating a current command based on the velocity command and the detected velocity by said velocity detecting means;

current detecting means for detecting a current for driving the servomotor;

a current control processing section for controlling the current based on the current command outputted from said velocity control processing section and the detected current by said current detecting means;

acceleration detecting means for detecting an acceleration of the driven element;

correcting means for correcting the velocity command or the current command based on the detected acceleration by said acceleration detecting means, and means for selectively nullifying the correction by said correcting means according to a signal from a host controller.

12. A controller according to claims 1 or 2, further comprising a position control processing section for controlling a position of the driven element based on a position command designating a position of the driven element and a detected position of the driven element and outputting the velocity command to said velocity control processing section, wherein said correcting means corrects the position command in place of the velocity command.

13. A controller according to any one of claims 1, 2, 4, 6–7, further comprising a position control processing section for controlling a position of the driven element based on a position command designating a position of the driven element and a detected position of the driven element having a term for integrating a position deviation between the position command and the detected position, so that an influence of a steady-state deviation caused by the detected acceleration is removed.

14. A controller according to any one of claims 1, 2, 3, 4–7, wherein the detected acceleration by said acceleration detecting means is subjected to processing by a band-pass filter.

15. A controller for controlling a servomotor for driving a driven element in accordance with a position command designating a position of the driven element, comprising:

position detecting means for detecting the position of the driven element;

acceleration detecting means for detecting an acceleration of the driven element;

a position estimation processing section for estimating the position of the driven element based on the detected acceleration by said acceleration detecting means; and a position control processing section for controlling the position of the driven element based on the position command, the estimated position by said position estimation processing section and the detected position by said position detecting means.

16. A controller according to claim 10 or 11, wherein the signal from the host controller is outputted in accordance with an external signal.

17. A controller according to claim 10 or 11, wherein the signal from the host controller is outputted in accordance with a program command.

18. A controller according to claim 10 or 11, wherein the signal from the host controller is outputted in dependence on whether or not the servomotor is controlled to perform a cutting feed in a machine tool.

19. A controller according to claim 10 or 11, wherein the signal from the host controller is outputted in a stopped state of the servomotor.

20. A controller according to any one of claims 1, 2, 3, 4–7, 8–9, 10–11 and 15, constituting a tandem control system in which the driven element is driven by a plurality of servomotors.

21. A controller according to any one of claims 3, 5–7, further comprising a position control processing section for controlling a position of the driven element based on a position command designating a position of the driven element and a detected position of the driven element having a term for integrating a position deviation between the position command and the detected position, so that an influence of a steady-state deviation caused by the estimated velocity is removed.

* * * * *

UNITED STATES PATENT AND TRADEMARK OFFICE
CERTIFICATE OF CORRECTION

| | | |
|---|---|---|
| PATENT NO. | : 7,187,148 B2 | Page 1 of 1 |
| APPLICATION NO. | : 11/287336 | |
| DATED | : March 6, 2007 | |
| INVENTOR(S) | : Tadashi Okita et al. | |

It is certified that error appears in the above-identified patent and that said Letters Patent is hereby corrected as shown below:

Column 15, Line 5, change "controlier" to --controller--.

Signed and Sealed this

Twenty-sixth Day of June, 2007

JON W. DUDAS
*Director of the United States Patent and Trademark Office*